US006765522B2

United States Patent
Greer

(10) Patent No.: US 6,765,522 B2
(45) Date of Patent: Jul. 20, 2004

(54) AUTOMATIC RECOGNITION OF RADAR SCAN TYPE

(75) Inventor: Thomas H. Greer, San Jose, CA (US)

(73) Assignee: Lockheed Martin Corporation

(*) Notice: Subject to any disclaimer, the term of this patent is extended or adjusted under 35 U.S.C. 154(b) by 0 days.

(21) Appl. No.: 10/200,957

(22) Filed: Jul. 23, 2002

(65) Prior Publication Data

US 2003/0038742 A1 Feb. 27, 2003

Related U.S. Application Data

(62) Division of application No. 09/939,879, filed on Aug. 27, 2001.

(51) Int. Cl.[7] ................................................. G01S 7/41
(52) U.S. Cl. ............................ 342/13; 342/90; 342/192; 342/196
(58) Field of Search .......................... 342/90, 192, 193, 342/195, 13, 45, 189

(56) References Cited

U.S. PATENT DOCUMENTS

| 4,209,835 | A | | 6/1980 | Guadagnolo | |
|---|---|---|---|---|---|
| 4,928,105 | A | | 5/1990 | Langner | |
| 5,396,250 | A | | 3/1995 | Tsui et al. | |
| 5,563,604 | A | * | 10/1996 | Brandao et al. | 342/159 |
| 5,565,764 | A | * | 10/1996 | Priebe et al. | 324/76.21 |
| 5,644,314 | A | * | 7/1997 | Ahmad et al. | 342/22 |
| 5,703,590 | A | | 12/1997 | Roth et al. | |
| 5,812,083 | A | * | 9/1998 | Johnson et al. | 342/90 |
| 5,999,561 | A | * | 12/1999 | Naden et al. | 375/142 |
| 6,090,147 | A | | 7/2000 | Bremner et al. | |
| 6,215,439 | B1 | * | 4/2001 | Geldart et al. | 342/192 |

* cited by examiner

Primary Examiner—Thomas H. Tarcza
Assistant Examiner—Isam Alsomiri
(74) Attorney, Agent, or Firm—Duane Morris LLP

(57) ABSTRACT

A system for determining the scan type of a signal, such as a radar signal, includes a scan detector, a transformer (e.g., an FFT algorithm), a correlator, and a decision block. The signal is received and processed by the scan detector. The scan detector provides an envelope signal, representing the scan type of the received signal. The envelope signal is transformed, typically from a time domain signal to a frequency domain signal, by any of several processes including a Fourier transform, a Laplace transform, an FFT, or a DFT. The transformed envelope signal is compared to several scan data sets by the correlator. Each scan data set represents a particular scan type. If the decision block determines that the comparison between the transformed envelope signal and a scan data set meets (or exceeds) a degree of similarity, the scan type of the received signal is determined to be the scan type of that scan data set.

6 Claims, 7 Drawing Sheets

AUTOMATIC RECOGNITION OF RADAR SCAN TYPE

CLAIM FOR PRIORITY AND CROSS REFERENCE TO RELATED APPLICATIONS:

This application is a divisional of and claims priority to U.S. patent application Ser. No. 09/939,879, filed Aug. 27, 2001.

GOVERNMENTAL INTEREST

This invention was prepared under government contract N00024-98-C-5422. The United States Government has certain rights in this invention.

FIELD OF THE INVENTION

This invention relates generally to radar detection, identification, and warning systems, and more particularly to a system and method for automatically determining radar scan type.

BACKGROUND OF THE INVENTION

Many radar systems search, or scan, a spatial region to detect and track targets of interest. Typically, radar systems transmit energy at a specific transmission frequency (carrier frequency) or set of transmission frequencies. Detected frequency, time, and amplitude characteristics of radar signals are typically used to identify the type of transmitter used to transmit the received signals. Often inferred from these characteristics are the type of weapon system associated with the transmitter, and the present operational mode (e.g., search, track, missile-in-flight). Present techniques used to classify and identify the received radar signals rely primarily on the measured carrier frequency parameters, frequency modulation type parameters, and time domain modulation parameters such as pulse width and pulse repetition interval, and scan type, often inferred from the more easily determined scan period.

However, many radar types that perform the same functions, such as search or fire control, have parameter domains that overlap. Scan type is an important parameter for resolving these ambiguities, and for determining the mode of an associated weapons system. The scan type indicates the type of scanning technique being used by a radar system, for example, conical scan or circular scan. Historically, scan type could only be determined by a human operator (usually present on large or dedicated signal collection platforms, but rarely present on combat platforms, and never on weapons or remotely piloted vehicles), listening to the scan modulation. Typically, the operator would listen for several scan periods, and even then the analysis was subject to human interpretation. This analysis requires an experienced operator, whose actions and analyses are of course, subject to human error. The likelihood of such errors or mistakes may be further increased when the operator must perform in the heat of battle or under other crisis conditions. Current automatic classification systems only infer likely scan type or types from scan rate. Scan rate is the rate at which the transmitted radar pulse is received by the receiving radar system. The analysis performed by these systems is often ambiguous and, because the identification of scan type is inferred from measured scan period, the inference itself can be wrong. Therefore, there is a need for a fast, repeatable, highly accurate mechanism for the automated determination of scan type as an aid to identifying radar types and modes, that does not suffer the above disadvantages.

Energy received at an unintended receiver (the target or a collection system, at a location other than the transmitter's receiver), also includes the signal amplitude envelope, modulated in accordance with the type of scan used by the transmitting radar system. Knowledge of the scan type can aid an operator (e.g., a pilot of a targeted aircraft, or an electronics warfare operator) in determining the type of radar transmission system, such as, for example ground base radar, airborne radar, or missile radar, and the mode of the associated weapons system (search, acquisition, track, missile guidance).

SUMMARY OF THE INVENTION

A system and method for determining a scan type of a signal include a scan detector for receiving a signal and providing an envelope signal. The envelope signal is indicative of the scan type of the signal. The envelope signal is transformed. A correlator compares the transformed envelope signal with at least one predetermined data set, wherein each predetermined data set corresponds to one of a plurality of scan types. The scan type of the signal is determined by a decision block in accordance with a degree of similarity between each of the predetermined data sets and the transformed envelope signal.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION

Many radar systems search, or scan, a spatial region to detect and/or track targets of interest. Typically, radar systems transmit energy at a specific transmission frequency (carrier frequency) or set of transmission frequencies. Energy received by a receiving platform, comprises the transmitted energy, which is amplitude modulated in accordance with the type of scan used by the transmitting radar system. Knowing the scan type can aid an operator (e.g., an electronics warfare operator, or a pilot of a targeted aircraft) in determining the type of radar transmission system, such as, for example ground base radar, airborne radar, missile radar, and/or the radar mode. A scan recognition system in accordance with the present invention determines the type of scan being employed by the transmitting radar system. As described, herein scan type is determined from the scan envelope and is not dependent upon radar frequency, frequency modulation, pulse width, pulse repetition rate, or scan rate.

Figure 1A:
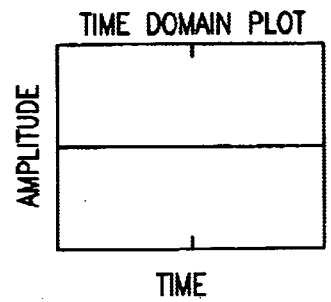
FIG. 1A is a time domain plot of the envelope of a steady scan recognizable by a scan recognition system in accordance with the present invention.
Figure 1C:
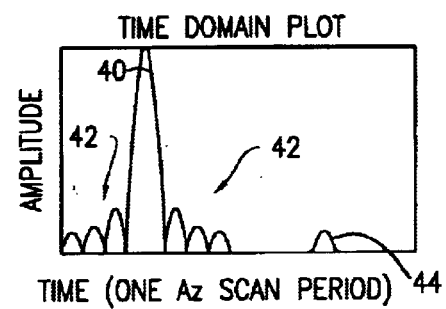
FIG. 1C is a time domain plot of the envelope of a circular scan recognizable by a scan recognition system in accordance with the present invention.

Various scanning techniques are employed by existing systems. In an exemplary embodiment of the invention, received energy is demodulated to provide an envelope signal representing the scan type. FIGS. 1A through 1Q are time domain plots of various types of radar scan envelope signals, over a single scan period, recognizable by a scan recognition system in accordance with the present invention.

FIG. 1A is a time domain plot of the envelope of a steady scan. A steady scan is the result of a transmitter emanating radiation with no apparent scanning of the transmitting antenna. A steady scan may indicate that the transmitter is part of a tracking radar, in a tight track, or other type of scan that has "locked in" on the receiving platform. A steady scan envelope is typically indicates that the receiving platform is being tracked, and is thus given high priority.

Figure 1B:
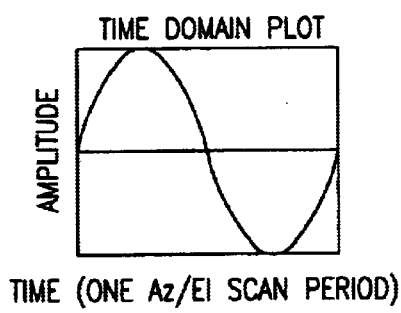
FIG. 1B is a time domain plot of the envelope of a conical scan recognizable by a scan recognition system in accordance with the present invention.

FIG. 1B is a time domain plot of the envelope of a conical scan. A conical scan is a continuous two-dimensional scan, in azimuth (az) and elevation (el), resulting in a sinusoidal modulation of the received carrier frequency, as long as the receiving platform is not being tightly tracked. As the receiving platform stays within the mainlobe of the transmitting radar's beam pattern, no sidelobes or other distinguishing features are noticeable in the envelope signal.

FIG. 1C is a time domain plot of the envelope of a circular scan. A circular scan is a continuous one-dimensional scan in azimuth resulting in modulation of the received carrier frequency showing the lobe structure of the antenna pattern of the transmitting radar system, including the mainlobe 40, sidelobes 42, and back lobe 44 (the energy received by the receiving platform when the mainlobe of the radar system is steered in a direction approximately 180° away from the receiving platform.

Figure 1D:
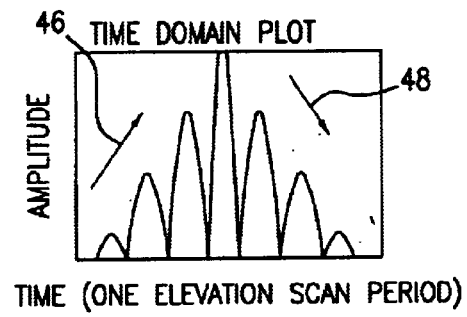
FIG. 1D is a time domain plot of the envelope of a helical scan recognizable by a scan recognition system in accordance with the present invention.

FIG. 1D is a time domain plot of the envelope of a helical scan. A helical scan is a continuous two-dimensional scan comprising a circular scan in azimuth superimposed on a slower linear scan in elevation. At the receiving platform, the modulation appears as a sequential circular scan, wherein the average received signal strength increases and decreases in a step like manner. As the mainlobe of the transmitted beam pattern approaches the elevation of the receiving platform, the signal strength increases (as shown by arrow 46). As the mainlobe of the transmitted beam pattern passes through the receiving platform's elevation and continues to higher elevations, the signal strength decreases (as shown by arrow 48).

Figure 1E:
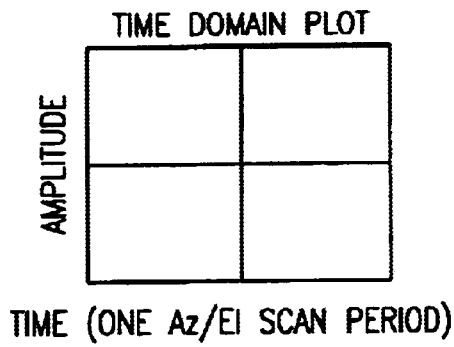
FIG. 1E is a time domain plot of the envelope of a lobe switching, or sequential lobing, recognizable by a scan recognition system in accordance with the present invention.
Figure 1G:
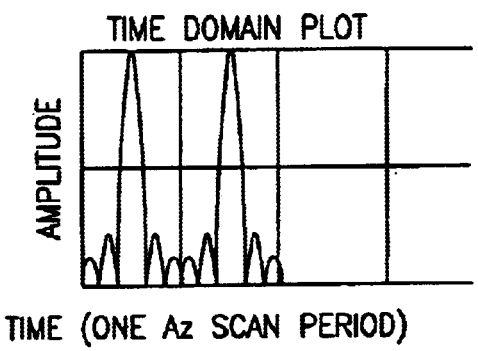
FIG. 1G is a time domain plot of the envelope of a bi-directional sector scan recognizable by a scan recognition system in accordance with the present invention.

FIG. 1E is a time domain plot of the envelope of lobe switching, or sequential lobing. Lobe switching is a continuous two-dimensional scan in azimuth and elevation resulting in a square wave modulation of the carrier frequency. As the receiving platform remains within the mainlobe of the beam pattern of the transmitting radar system, no side lobes or other distinguishing features of the transmitting radar system's antenna pattern are apparent.

Figure 1F:
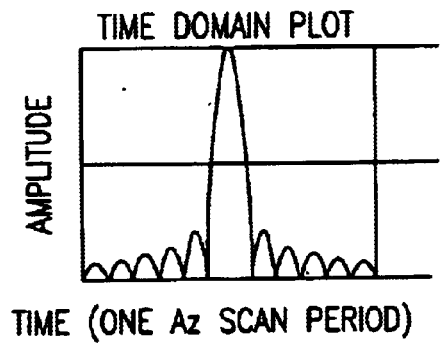
FIG. 1F is a time domain plot of the envelope of a unidirectional sector scan recognizable by a scan recognition system in accordance with the present invention.

FIG. 1F is a time domain plot of the envelope of a unidirectional sector scan. A unidirectional sector scan is a discontinuous one-dimensional scan in azimuth resulting in modulation of the received carrier frequency displaying the lobe structure of the transmitting radar system's antenna pattern. If the transmitting radar system's transmitter is not blanked, the fly-back may be observed (e.g., via audio cues to an operator). The envelope of the unidirectional sector scan is similar to the envelope of the circular scan except that the envelope of the unidirectional sector scan does not show the back lobe structure.

FIG. 1G is a time domain plot of the envelope of a bi-directional sector scan. A bi-directional sector scan is a continuous one-dimensional scan in azimuth resulting in modulation of the received carrier frequency displaying the lobe structure of the transmitting radar system's antenna pattern. The scan periods in each direction are typically of different length, thus distinguishing the bi-directional sector scan envelope from the circular scan envelope. However, if the receiving platform is located on a ray bifurcating of the transmitting radar's scan axis, the bi-directional sector scan may be indistinguishable from the unidirectional sector scan envelope.

Figure 1H:
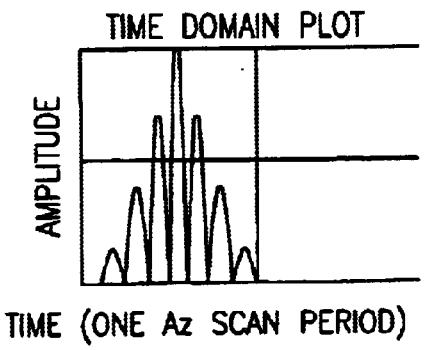
FIG. 1H is a time domain plot of the envelope of a circular raster scan recognizable by a scan recognition system in accordance with the present invention.

FIG. 1H is a time domain plot of the envelope of a circular raster scan. A circular raster scan is a two-dimensional scan in azimuth and elevation defined as a slow circular scan in azimuth with a faster unidirectional superimposed elevation sector scan (thus not a true interlaced raster). From the perspective of the receiving platform, the envelope of the circular raster scan appears similar to the envelope of the helical scan. However, audio cues provided by the envelope of the circular raster scan differ substantially from audio cues provided by the envelope of the helical scan. The difference is based, primarily on the modulation rates associated with each scan type. The main lobes of a circular raster scan are separated at the elevation scan period, and not the azimuth scan period as in the helical scan. Also, the elevation scan rate for the circular raster scan is greater than the azimuth scan rate for helical scan.

Figure 1I:
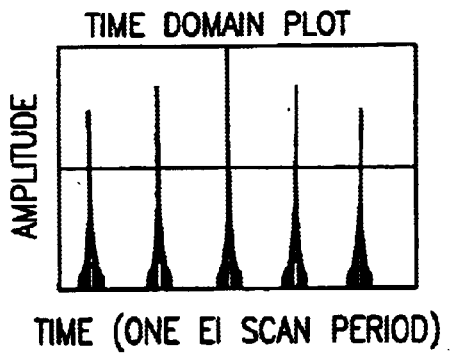
FIG. 1I is a time domain plot of the envelope of a unidirectional raster scan recognizable by a scan recognition system in accordance with the present invention.
Figure 1K:
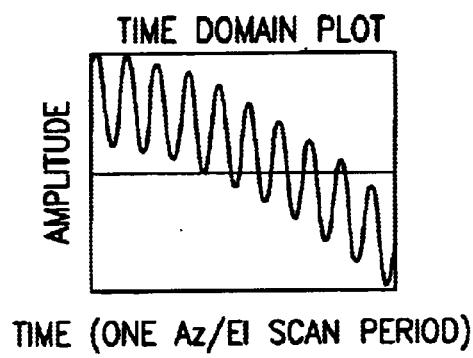
FIG. 1K is a time domain plot of the envelope of a spiral scan recognizable by a scan recognition system in accordance with the present invention.

FIG. 1I is a time domain plot of the envelope of a unidirectional raster scan. A unidirectional raster scan is a two dimensional scan comprising a unidirectional sector scan in azimuth superimposed on a slower unidirectional sector scan in elevation (thus, not a true raster scan). From the perspective of the receiving platform, the envelope of the unidirectional raster scan appears similar to the envelope of the helical and circular raster scans. However, audio cues provided by the envelope of the unidirectional raster scan differ substantially from audio cues provided by the envelope of the helical and circular raster scans. The difference is based, primarily on the modulation rates associated with each scan type. The main lobes of a unidirectional raster scan are separated at the elevation scan period, and not the azimuth scan period as in the helical scan. Also, the elevation scan rate for the unidirectional raster scan is greater than the azimuth scan rate for helical scan.

Figure 1J:
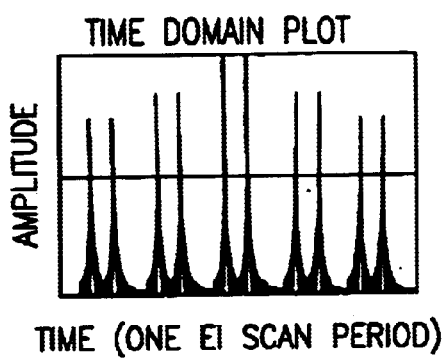
FIG. 1J is a time domain plot of the envelope of a bi-directional raster scan recognizable by a scan recognition system in accordance with the present invention.

FIG. 1J is a time domain plot of the envelope of a bi-directional raster scan. A bi-directional raster scan is a two dimensional scan comprising a bi-directional sector scan in azimuth superimposed on a slower unidirectional sector scan in elevation (thus, not a true interlaced raster scan). From the perspective of the receiving platform, the scan envelope appears similar to a unidirectional raster scan, except that alternating scan periods differ. However, if the receiving platform is located on a ray bifurcating the scan axis, the bi-directional raster scan appears very similar to the unidirectional raster scan.

FIG. 1K is a time domain plot of the envelope of a spiral scan. A spiral scan is a two dimensional scan in azimuth and elevation. From the perspective of the receiving platform, the envelope of the spiral scan appears similar to a conical scan in azimuth combined with a lower frequency (scan frequency) conical scan in elevation.

Figure 1L:
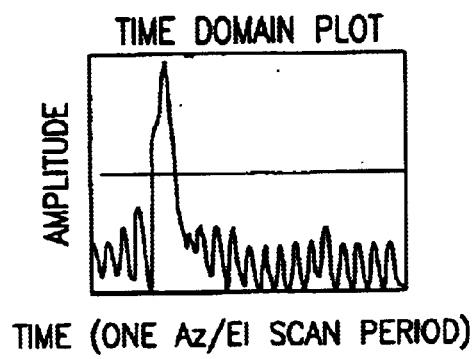
FIG. 1L is a time domain plot of the envelope of a Palmer circular scan recognizable by a scan recognition system in accordance with the present invention.

FIG. 1L is a time domain plot of the envelope of a Palmer circular scan. A Palmer circular scan is defined as a slower circular scan (in azimuth) having a higher rate conical scan superimposed upon it.

Figure 1M:
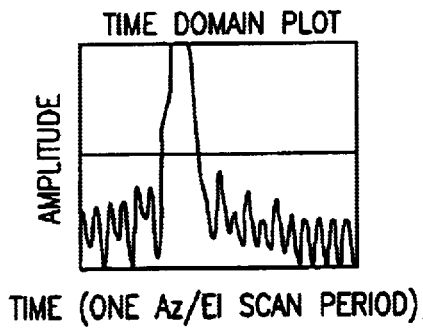
FIG. 1M is a time domain plot of the envelope of a Palmer unidirectional scan recognizable by a scan recognition system in accordance with the present invention.
Figure 1P:
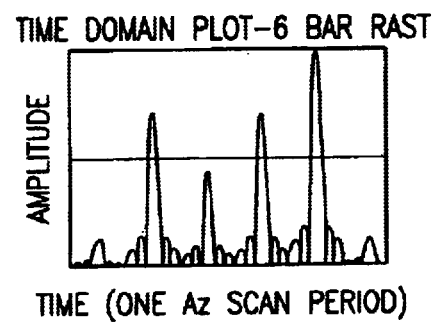
FIG. 1P is a time domain plot of the envelope of a true raster scan recognizable by a scan recognition system in accordance with the present invention.

FIG. 1M is a time domain plot of the envelope of Palmer unidirectional scan. A Palmer unidirectional scan is defined as a slower rate unidirectional sector scan having a higher rate conical scan superimposed upon it.

Figure 1N:
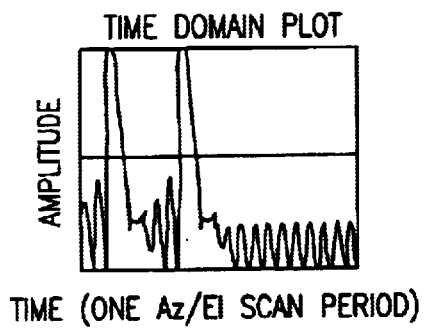
FIG. 1N is a time domain plot of the envelope of a Palmer bi-directional scan recognizable by a scan recognition system in accordance with the present invention.
Figure 1Q:
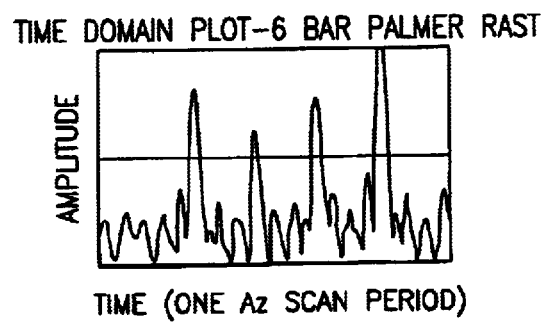
FIG. 1Q is a time domain plot of the envelope of a Palmer raster scan recognizable by a scan recognition system in accordance with the present invention.

FIG. 1N is a time domain plot of the envelope of Palmer bi-directional scan. A Palmer bi-directional scan is defined as a slower rate bi-directional sector scan having a higher rate conical scan superimposed upon it.

FIG. 1P is a time domain plot of the envelope of a true raster scan. A true raster scan is a two dimensional scan in azimuth and elevation resulting in an envelope comprising interlaced elevation steps. The envelope of a true raster scan in not monotonic. From the perspective of the receiving platform, the modulation appears to be similar to a vertical sector scan, wherein the average received signal strength exhibits interlaced steps. The average received signal strength generally (not monotonically) increases as the transmitting radar system's mainlobe beam approaches the elevation of the receiving platform. The average received signal strength generally (not monotonically) decreases as the transmitting radar system's mainlobe beam moves away from the receiving platform's elevation. The maximum signal strength of the received energy is observed at the scan sweep closest to the receiving platform's elevation. The maximum signal strength slowly increases as the azimuth scan approaches the receiving platform's position, and slowly decreases as the azimuth scan moves away from the receiving platform's position.

FIG. 1Q is a time domain plot of the envelope of a Palmer raster scan. A Palmer raster scan comprises a higher rate conical scan superimposed upon a slower rate true raster scan.

Figure 2:
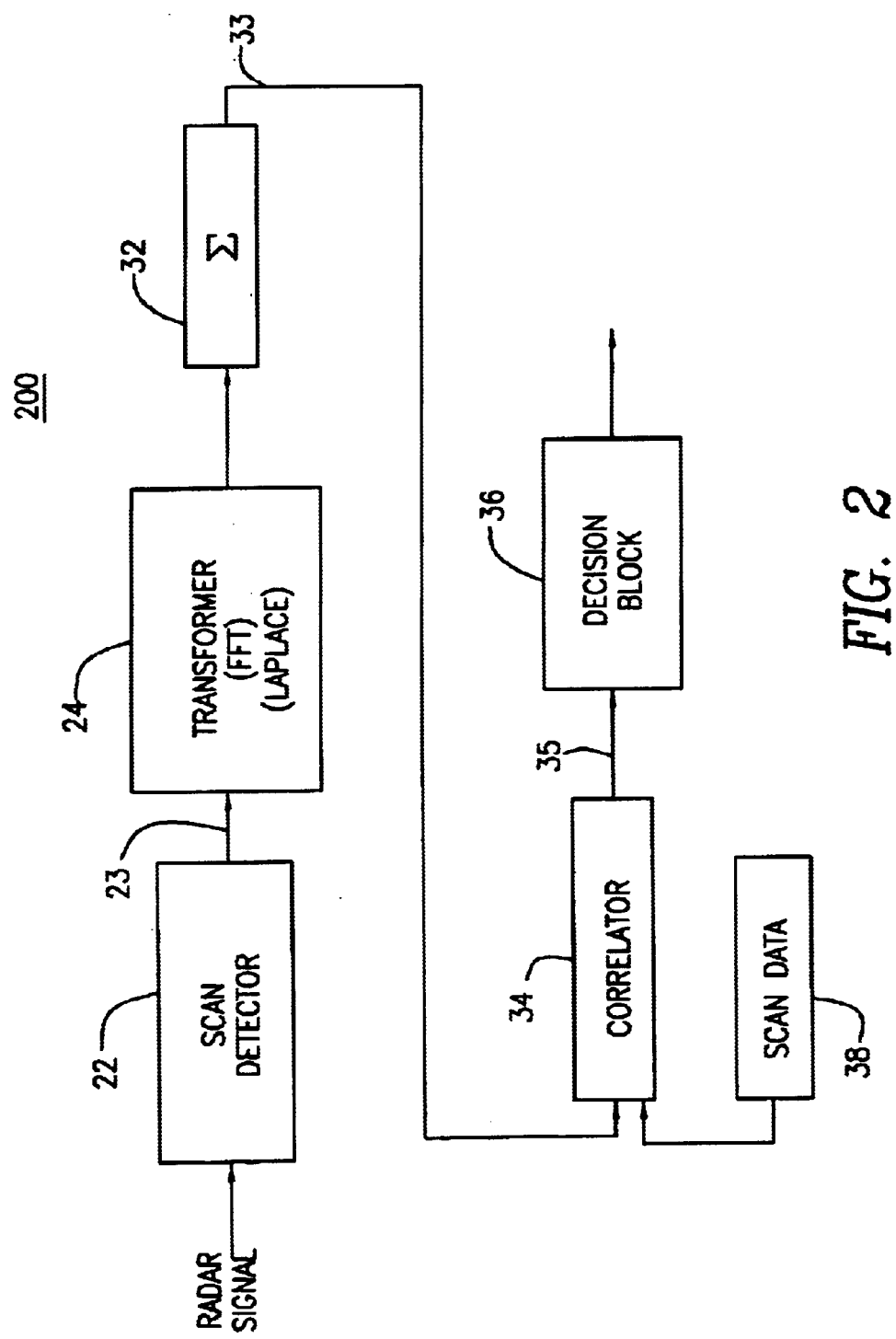
FIG. 2 is a functional block diagram of an exemplary automatic scan type recognition system 200 in accordance with the present invention.

FIG. 2 is a functional block diagram of an exemplary automatic scan type recognition system 200 in accordance with the present invention. As shown, a signal is received by scan detector 22. The signal received by scan detector 22 may be in various forms, including electromagnetic, acoustic, and optical. In an exemplary embodiment of the invention, the signal received by scan detector 22 is a radar signal. Scan detector 22 receives the radar signal and provides an envelope signal 23, representing the scan type of the received signal, to the transformer 24. The scan detector 22 may comprise any type of envelope detector circuit, such as a diode, a capacitor, and a resistor for detecting the shape of the input envelope of the Radar signal and generating an output voltage waveform corresponding to the envelope of the input Radar Signal, for example. The transformer 24 transforms the envelope signal from the time domain to the frequency domain. The frequency domain signal is provided to optional integrator 32, to be integrated, or averaged, over a predetermined time period or number of scans. The integrated signal 33, is provided to correlator 34 which also receives as input scan data 38. Correlator 34 compares integrated signal data 33 with the predetermined sets of scan data 38 to generate an output signal 35. The resultant output signal 35 provided by the comparison process are evaluated by decision block 36 for providing an indicator of the scan type of the received signal.

Figure 3:
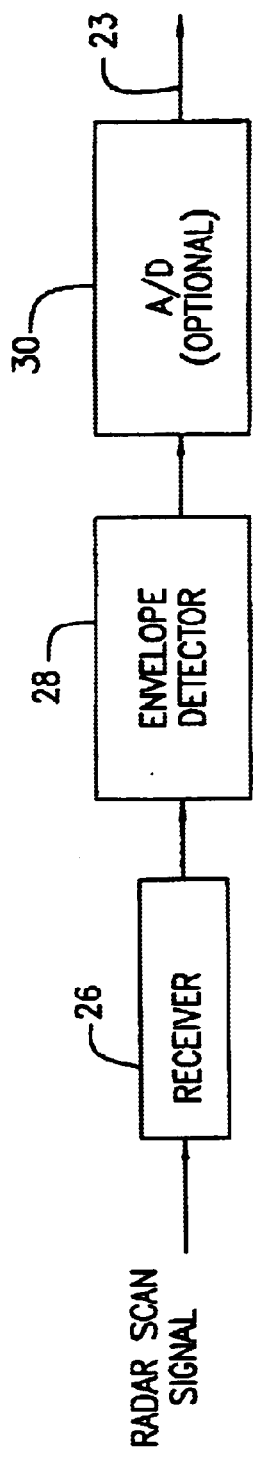
FIG. 3 is a functional block diagram of an exemplary scan detector in accordance with an embodiment of the present invention.

FIG. 3 is a functional block diagram of an exemplary scan detector in accordance with an embodiment of the present invention. In this embodiment, scan detector 22 comprises a receiver 26, an envelope detector 28, and an analog to digital (A/D) converter 30. Receiver 26 is a transducer, which receives the radar signal and converts it to an electrical signal. Receiver 26 may be any appropriate receiver known in the art such as a detector diode and integrator, for example. Envelope detector 28 receives the electrical signal provided by receiver 22 and demodulates the signal, providing the envelope of the scan of the signal. The envelope signal is provided to the A/D converter 30 for conversion from an analog signal to a digital signal. A/D converter 30 is optional. An automatic scan recognition system in accordance with the present invention may comprise analog and/or digital processing. However, a plethora of software and algorithms have been developed for digital processors with applications for digital signals. thus in an exemplary embodiment of the invention, the analog envelope signal is converted to a digital envelope signal by A/D converter 30.

Referring again to FIG. 2, the scan detector 22 provides an envelope signal to the transformer 24. The transformer 24 transforms the envelope signal in the time domain to the frequency domain. The transformer 24 performs any type of appropriate transformation such as a Fourier transform or a Laplace transform. The transformer 24 may perform the transformation on either an analog or digital signal. Examples of algorithms used to perform the transformation of a digital version of the envelope signal in accordance with an exemplary embodiment of the invention include the Fast Fourier Transform (FFT) and the Discrete Fourier Transform (DFT). In an exemplary embodiment of the invention, the digital transformed envelope is stored in memory in the form of Fourier coefficients. The Fourier coefficients represent the amplitude of each frequency bin of the digitized envelope signal. The transformer 24 provides the transformed envelope signal to the optional integrator 32.

The integrator 32 combines a plurality of received scans into a single scan. The integrator 32 combines these scans to improve processing performance by, for example, decreasing noise, increasing the signal to noise ratio, and/or reducing processing throughput requirements. Combining scans with integrator 32 is optional. If the received scans differ from scan to scan, integration (combination) may not improve processing performance. Thus, various embodiments of the invention may or may not comprise integrator 32. In yet another embodiment of the invention, integration is accomplished in the time domain, before performing a time domain to frequency domain transformation. Integrator 32 may perform any appropriate type of combination including, for example, a straight summation, a weighted summation, an average, a weighted average, and an integration function.

The frequency domain data of the envelope signal (e.g., Fourier coefficients) are compared to predetermined sets of scan data 38 by correlator 34. Each predetermined set of scan data comprises frequency domain data representing a particular scan type. In an exemplary embodiment of the invention, each predetermined set of scan data comprises Fourier coefficients representing each of the scan types described herein with respect to FIGS. 1A through 1Q. The comparison process may comprise any appropriate comparison process, such as a data point to data point comparison, and/or a cross-correlation process. Also, the cross-correlation process may comprise applying windowing, or tapering, functions (windowing and tapering functions are well know in the art) to the frequency domain envelope signal, the data set, or both. Further, to increase the probability of correct scan type identification, the comparison process may comprise squaring or cubing each frequency bin of the frequency domain envelope signal, the data set, or both. The squaring/cubing process may be done prior to, or after, the actual comparison of the data.

The results of the comparison process performed by correlator 34 are analyzed in the decision block 36. Decision block 36 analyzes the results of the comparison to determine the degree of similarity between the frequency domain representation of the envelope signal and the predetermined sets of scan data 38. If a desired degree of similarity is met between the frequency domain of the envelope signal and a predetermined set of scan data, the scan type of the received signal is determined to be of the type represented by that data set. For example, assume a signal is received by scan detector 22 and processed in accordance with an FFT algorithm by transformer 24. Fourier coefficients of the received signal are then compared to several sets of data 38 in accordance with a cross-correlation function by correlator 24. Assuming further that the output for each cross-correlation, except one, is approximately equal to 0.1, and one cross-correlation is equal to 0.9. Decision block 36 will determine that the scan type represented by the data set that resulted in 0.9 to be the scan type of the received signal. Accordingly, this scan type will be provided to an operator, display device, storage device, and/or a processor.

Decision block 36 may determine if the desired degree of similarity is met in any of several ways. For example, the desired degree of similarity may be considered met by all comparison results above a predetermined threshold, by the comparison result with the highest result value above a predetermined threshold, and/or by the comparison result (or results in the case of a tie) with the highest result value from all comparison results. To further increase the probability of correctly determining a received scan type, a discrimination function may be applied to the comparison and decision processes.

Figure 4:
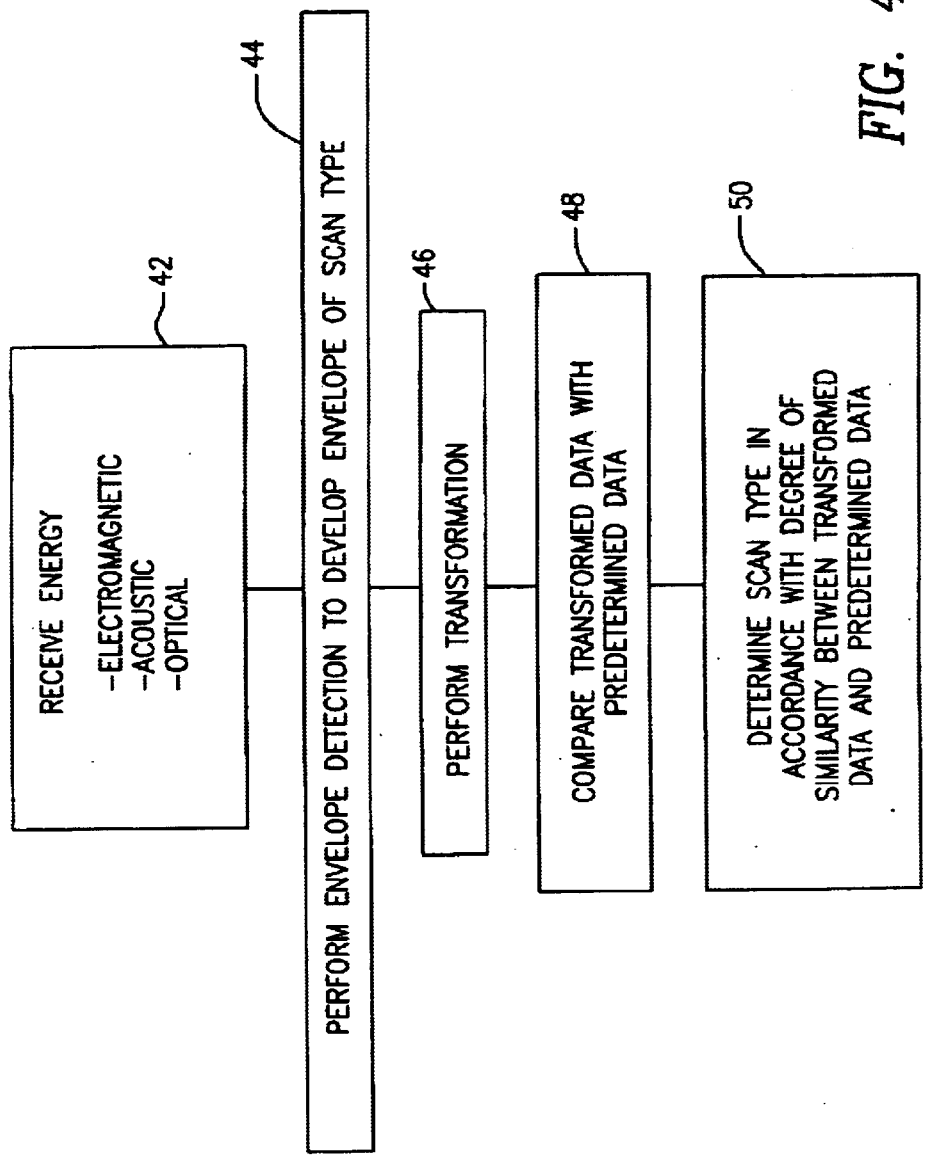
FIG. 4 is a flow diagram of an exemplary process to automatically determine a scan type in accordance with an embodiment of the invention.

FIG. 4 is a flow diagram of an exemplary process to automatically determine a scan type in accordance with an embodiment of the invention. In step 42, a signal is received and processed as described herein with reference to scan detector 22. The received signal may be in various forms, including electromagnetic, acoustic, and optical. In an exemplary embodiment of the invention, the received signal is a radar signal. Envelope detection is performed in step 44. An envelope signal, representing the scan type of the received signal is developed. The envelope of the received signal is transformed from the time domain to the frequency domain in step 46, in accordance with the description provided herein with reference to transformer 24. Appropriate transformations include a Fourier transform or a Laplace transform. Transformation may be performed on either an analog or digital signal. Examples of algorithms used to perform the transformation of a digital version of the envelope signal in accordance with an exemplary embodiment of the invention include the Fast Fourier Transform (FFT) and the Discrete Fourier Transform (DFT). In an exemplary embodiment of the invention, the digital transformed envelope is by Fourier coefficients. The Fourier coefficients represent the amplitude of each frequency bin of the digitized envelope signal. The frequency domain signal may be optionally integrated, as described herein with reference to integrator 32.

The frequency domain signal is compared with predetermined sets of scan data in step 48. The results of the comparison process are evaluated and a determination as to the scan type of the received signal is performed in step 50. The comparison process (step 48) and decision process (step 50) are performed in accordance with the description provided herein with reference to correlator 34, decision block 36, and scan data 38. The frequency domain data of the envelope signal (e.g., Fourier coefficients) are compared to predetermined sets of scan data, wherein each predetermined set of scan data comprises frequency domain data representing a particular scan type. In an exemplary embodiment of the invention, each predetermined set of scan data comprises Fourier coefficients representing each of the scan types described herein with respect to FIGS. 1A through 1Q. The comparison process (step 48) may comprise any appropriate comparison process, such as a data point to data point comparison, and/or a cross-correlation process. Further, to increase the probability of correct scan type identification, the comparison process (step 48) may comprise squaring or cubing each frequency bin of the frequency domain envelope signal, each scan data set, or both. The squaring/cubing process may be done prior to, or after, the actual comparison of the data.

The results of the comparison process (step 48) are analyzed in step 50 to determine the degree of similarity between the frequency domain representation of the envelope signal and the predetermined sets of scan data. If a desired degree of similarity is met between the frequency domain of the envelope signal and a predetermined set of scan data, the scan type of the received signal is determined to be of the type represented by that data set. The determined scan type is provided to an operator, display device, storage device, and/or a processor. A desired degree of similarity may be considered met by performing any of several techniques. For example, the desired degree of similarity may be considered met by all comparison results above a predetermined threshold, by the comparison result with the highest result value above a predetermined threshold, and/or by the comparison result (or results in the case of a tie) with the highest result value from all comparison results. To further increase the probability of correctly determining a received scan type, a discrimination function may be applied to the comparison process (step 48) and/or the decision process (step 50).

Figure 5:
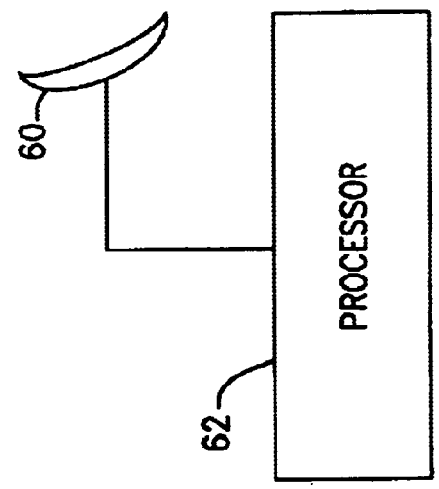
FIG. 5 is a block diagram of a receiving platform comprising an antenna and a computer processor, in accordance with an exemplary embodiment of the invention.

The present invention may be embodied in the form of computer-implemented processes and apparatus for practicing those processes. FIG. 5 is a block diagram of a receiving platform comprising an antenna 60 and a computer processor 62, in accordance with an exemplary embodiment of the invention. A signal is received by antenna 60. Antenna 60 may be any antenna known in the art, typically designed to intercept radar signals of various polarizations over a wide frequency range, such as a horn antenna, a parabolic dish antenna, and/or an antenna array (all with circularly polarized or dual orthogonal linearly polarized feeds or elements). Envelope detection, transformation, comparison, and decision processes are performed, as described herein, by the computer processor 62. Processing may also be performed by special purpose hardware.

The present invention may also be embodied in the form of computer program code embodied in tangible media, such as floppy diskettes, read only memories (ROMs), CD-ROMs, hard drives, high density disk, or any other computer-readable storage medium, wherein, when the computer program code is loaded into and executed by computer processor 62, the computer processor 62 becomes an apparatus for practicing the invention. The present invention may also be embodied in the form of computer program code, for example, whether stored in a storage medium, loaded into and/or executed by computer processor 62, or transmitted over some transmission medium, such as over electrical wiring or cabling, through fiber optics, or via electromagnetic radiation, wherein, when the computer program code is loaded into and executed by computer processor 62, the computer processor 62 becomes an apparatus for practicing the invention. When implemented on a general-purpose processor, the computer program code segments configure the processor to create specific logic circuits.

Although illustrated and described herein with reference to certain specific embodiments, the present invention is nevertheless not intended to be limited to the details shown. Rather, various modifications may be made in the details within the scope and range of equivalents of the claims and without departing from the spirit of the invention.

What is claimed is:

1. A computer readable medium having embodied thereon a computer program for causing a computer to determine a scan type of a signal, the computer readable program comprising:

means for causing said computer to perform scan detection on said signal for providing an envelope signal, said envelope signal being indicative of said scan type of said signal;

means for causing said computer to transform said envelope signal;

means for causing said computer to compare said transformed envelope signal with at least one predetermined data set, wherein each predetermined data set corresponds to one of a plurality of scan types; and means for causing said computer to determine the scan type of said signal in accordance with a degree of similarity of said at least one predetermined data set and said transformed envelope signal.

2. A computer readable medium in accordance with claim 1, wherein said computer program comprises means for causing said computer to transform said envelope signal in accordance with one of a Fourier transform, a Laplace transform, an FFT, and a DFT.

3. A computer readable medium in accordance with claim 1, wherein said signal represents a radar signal.

4. A computer readable medium in accordance with claim 1, wherein said computer program comprises means for causing said computer to cross-correlate said transformed envelope signal with at least one predetermined data set.

5. A computer readable medium in accordance with claim 1, said computer program comprises means for causing said computer to determine that a scan type of said signal is a scan type corresponding to a compared data set if said degree of similarity exceeds a predetermined threshold.

6. A computer readable medium in accordance with claim 1, wherein said scan type is indicative of a transmission amplitude modulation characteristic of said signal.

* * * * *